United States Patent
Natanzon

(10) Patent No.: US 8,521,691 B1
(45) Date of Patent: Aug. 27, 2013

(54) SEAMLESS MIGRATION BETWEEN REPLICATION TECHNOLOGIES

(75) Inventor: Assaf Natanzon, Ramat Gan (IL)

(73) Assignee: EMC Corporation, Hopkinton, MA (US)

(*) Notice: Subject to any disclaimer, the term of this patent is extended or adjusted under 35 U.S.C. 154(b) by 133 days.

(21) Appl. No.: 13/168,182

(22) Filed: Jun. 24, 2011

(51) Int. Cl.
G06F 17/00 (2006.01)
G06F 17/30 (2006.01)

(52) U.S. Cl.
CPC .............................. *G06F 17/30017* (2013.01)
USPC .......................................................... 707/640

(58) Field of Classification Search
USPC ................. 707/622, 639, 640, 641, 645, 646, 707/652, 653; 711/161, 162; 714/15
See application file for complete search history.

(56) References Cited

U.S. PATENT DOCUMENTS

| | | | | |
|---|---|---|---|---|
| 5,901,327 A * | 5/1999 | Ofek | .................................. | 710/5 |
| 6,076,148 A * | 6/2000 | Kedem | ........................... | 711/162 |
| 7,275,177 B2 * | 9/2007 | Armangau et al. | ............. | 714/5.1 |
| 7,383,463 B2 * | 6/2008 | Hayden et al. | ............... | 714/4.11 |
| 8,103,937 B1 * | 1/2012 | Natanzon et al. | ............. | 714/763 |
| 8,214,612 B1 * | 7/2012 | Natanzon | ...................... | 711/162 |
| 8,332,687 B1 * | 12/2012 | Natanzon et al. | ............. | 714/6.3 |
| 8,335,771 B1 * | 12/2012 | Natanzon et al. | ............. | 707/684 |
| 2005/0015663 A1 * | 1/2005 | Armangau et al. | ............. | 714/15 |

OTHER PUBLICATIONS

Ann Chervenak et al., Wide Area Data Replication for Scientific Collaborations, 2005, IEEE, 1-8.*

* cited by examiner

*Primary Examiner* — Jean B Fleurantin
(74) *Attorney, Agent, or Firm* — Krishnendu Gupta; Gerald P. Kazanjian

(57) ABSTRACT

Traditional methods for migrating between replication technologies require stopping the old replication technology and starting with the new replication technology from scratch. Replicated data sizes can be very large (e.g., on the order of a petabyte) which can take a considerable amount of time, often several weeks, to read. During this time, replication is unavailable. Example embodiments of the present invention provide a method, apparatus and computer-program product for seamless migration from a preexisting replication service to a new replication service by configuring the new replication service, disabling the preexisting replication service enabling the new replication service. Example embodiments of the present invention also provide for querying storage to determine available replication sets, presenting a graphical user interface to a user to enable the user to select a replication set for migration and automatically performing the migration.

20 Claims, 6 Drawing Sheets

SEAMLESS MIGRATION BETWEEN REPLICATION TECHNOLOGIES

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

Traditional methods for migrating between replication technologies require stopping the old replication technology (i.e., the replication technology being replaced) and starting with the new replication technology from scratch. For example, consider a storage array with several volumes replicated using a preexisting replication technology. If a user desires to continue replication but using a new replication technology, such as RecoverPoint by EMC Corporation of Hopkinton, Mass., traditional migration methods require resynchronizing data between the production site and the replication site using the new replication technology once it is brought online. Replicated data sizes can be very large (e.g., on the order of a petabyte) thereby causing resynchronization to take a considerable amount of time, often several weeks, to read. During this time, replication is unavailable.

SUMMARY

Example embodiments of the present invention provide a method, apparatus and computer-program product for seamless migration from a preexisting replication service to a new replication service by configuring the new replication service, disabling the preexisting replication service enabling the new replication service.

BRIEF DESCRIPTION OF THE DRAWINGS

The above and further advantages of the present invention may be better under stood by referring to the following description taken into conjunction with the accompanying drawings in which.

DETAILED DESCRIPTION

Figure 1:
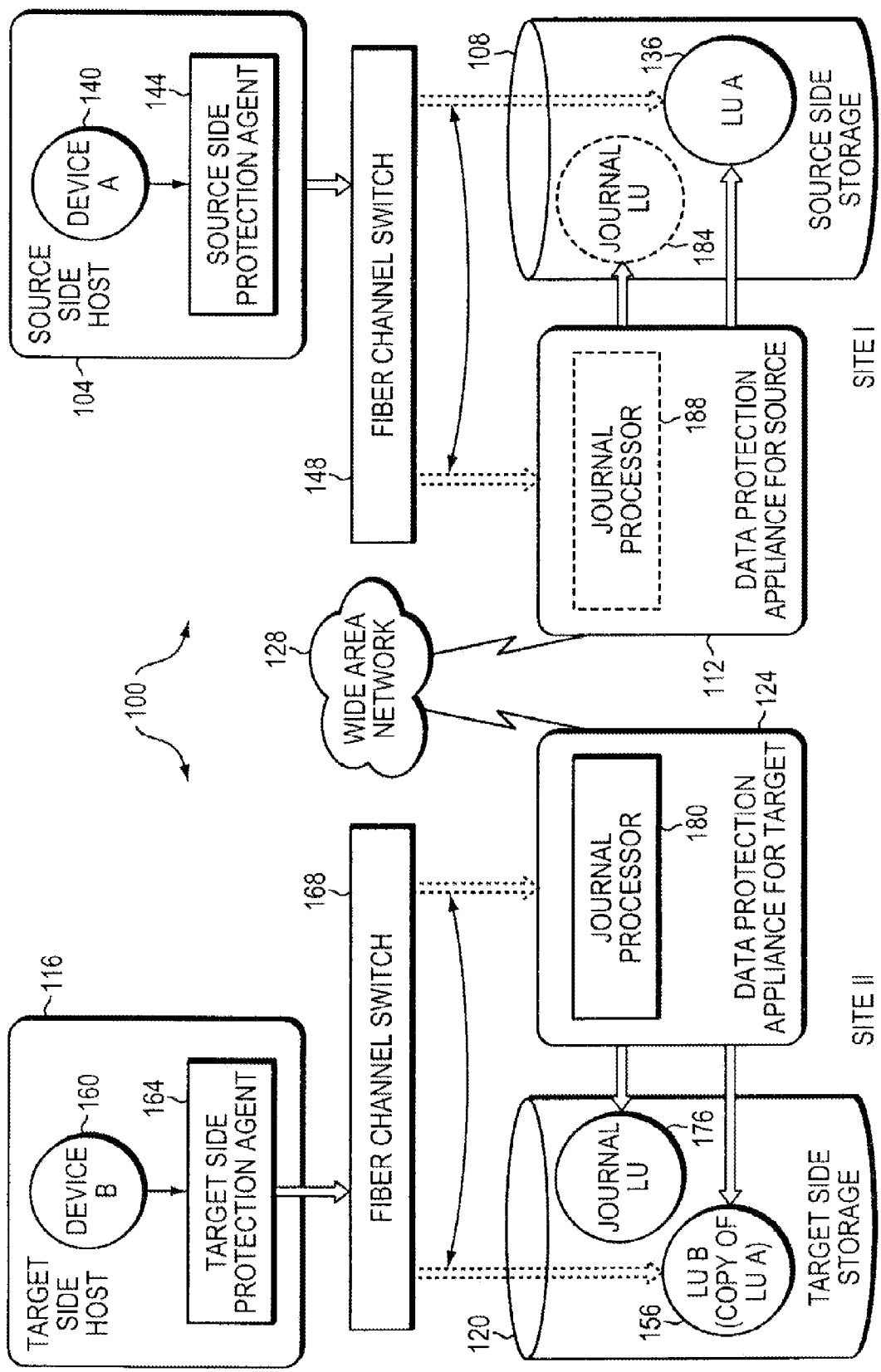
FIG. 1 is a simplified illustration of a data protection system, in accordance with an embodiment of the present invention.

Journaling uses significant amounts of the volume on which the journal is stored. Conventionally, replication systems dynamically add storage for a journal, as described in U.S. Pat. No. 7,840,536, entitled "METHODS AND APPARATUS FOR DYNAMIC JOURNAL EXPANSIONASSIGNED," issued on Nov. 23, 2010 and assigned to EMC Corporation of Hopkinton, Mass., which is hereby incorporated by reference in its entirety. However, such conventional journaling mechanisms lack efficient methods to decrease the size of the journal.

Accordingly, example embodiments of the present invention leverage the punch command and thin LUNs in order to create a fully dynamic journal which can shrink and grow on demand. The journal may be assigned a maximum allowed size, as well as a journal protection window defining a period for which the journal should retain journal information. A set of currently used blocks will be used and, if protection window is large enough, the oldest data blocks from an undo stream will be punched out from the stream. The blocks may be large journal blocks of a direct LUN (DLUN). DLUNs are LUNs which thin having large volume chunks (e.g., 128 MB or 1 GB). Accordingly, the punch command punches large slices out of the LUN; however, the chunks are big enough that sequential I/Os remain sequential, thereby increasing performance. A manager may monitor how much free space there is in the storage pool and regulate the journal growth if the pool is nearly empty. Additionally, the journal capacity may also depend on the actual usage of the replicated LUNs if the replicated LUNs are thin (i.e., maintain the journal at a particular percentage of the used storage capacity).

The following definitions are employed throughout the specification and claims.

BACKUP SITE—a facility where replicated production site data is stored; the backup site may be located in a remote site or at the same location as the production site;

CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical;

DPA—a computer or a cluster of computers that serve as a data protection appliance, responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGICAL UNIT—a logical entity provided by a storage system for accessing data from the storage system;

LUN—a logical unit number for identifying a logical unit;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period;

SPLITTER/PROTECTION AGENT—may be an agent running either on a production host a switch or a storage array which can intercept I/O and split them to a DPA and to the storage array, fail I/O redirect I/O or do any other manipulation to the I/O;

STORAGE SYSTEM—a SAN entity that provides multiple logical units for access by multiple SAN initiators;

TARGET—a node in a SAN that replies to I/O requests;

TARGET SIDE—a receiver of data within a data replication workflow; during normal operation a back site is the target side, and during data recovery a production site is the target side; and WAN—a wide area network that connects local networks and enables them to communicate with one another, such as the Internet.

DESCRIPTION OF EMBODIMENTS USING A FIVE STATE JOURNALING PROCESS

FIG. 1 is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands. System 100 includes source storage system 108 and target storage system 120.

Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit;
Redirect the SCSI command to another logical unit;
Split the SCSI command by sending it first to the respective DPA. After the DPA returns an acknowledgement, send the SCSI command to its intended logical unit;
Fail a SCSI command by returning an error return code; and
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
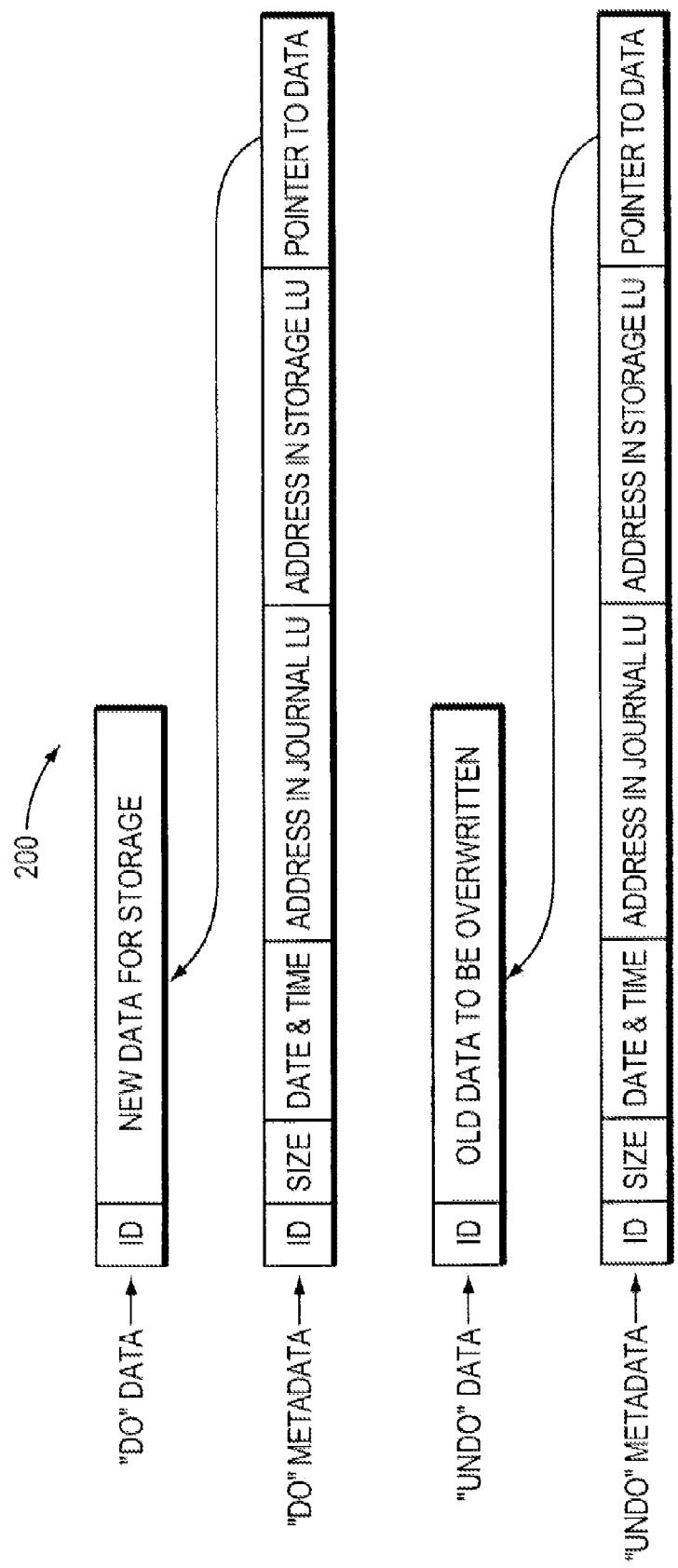
FIG. 2 is a simplified illustration of a write transaction for a journal, in accordance with an embodiment of the present invention.
Figure 3:
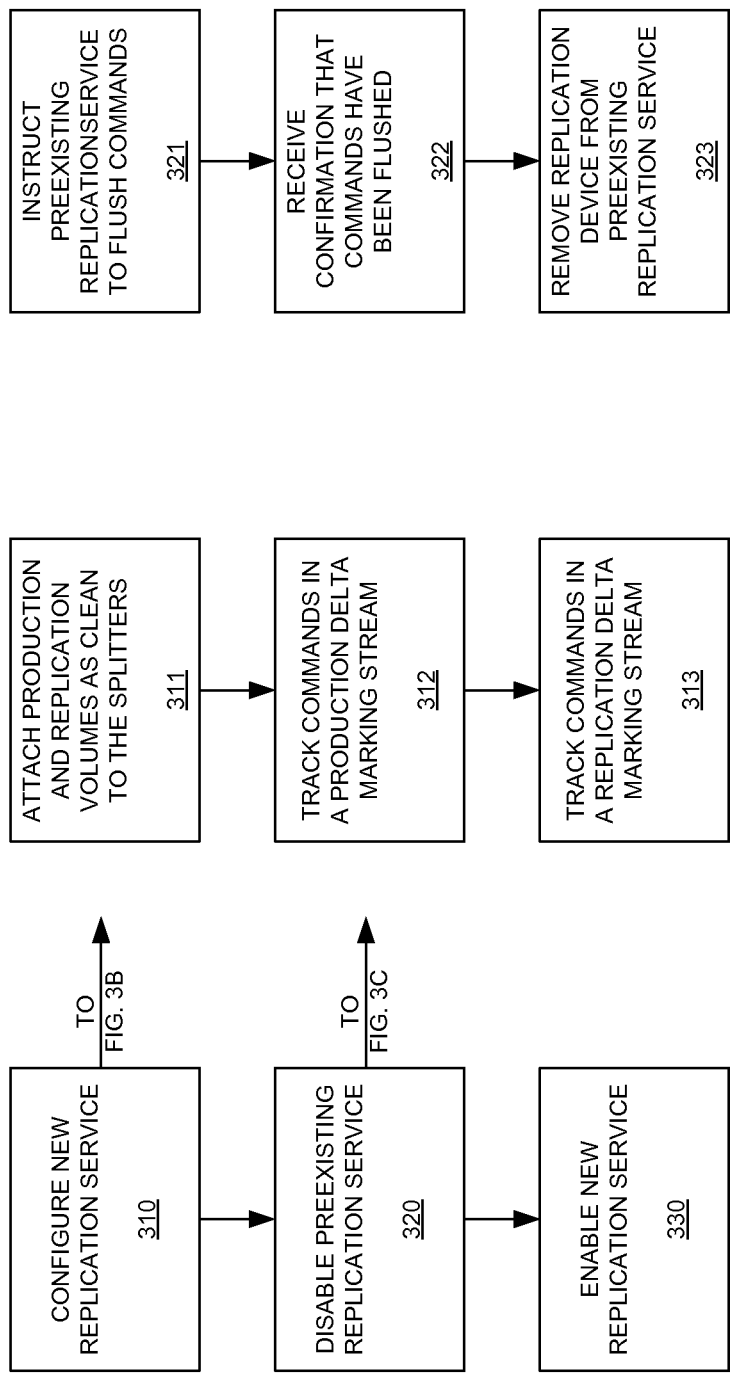
FIGS. 3A-3C are flow diagrams illustrating example methods for seamless migration from a preexisting replication service configured to provide replication from a production volume at a production site to a replication volume at a replication site according to an example embodiment of the present invention.

FIG. 2 is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

A discussion of mirroring may be found in U.S. Pat. No. 7,346,805, entitled "PROTECTION OF MIRRORED DATA," issued on Mar. 18, 2008 and assigned to EMC Corporation of Hopkinton, Mass., which is hereby incorporated by reference in its entirety.

A discussion of journaling and some techniques associated with journaling may be found in U.S. Pat. No. 7,516,287, entitled "METHODS AND APPARATUS FOR OPTIMAL JOURNALING FOR CONTINUOUS DATA REPLICATION," issued on Apr. 7, 2009 and assigned to EMC Corporation of Hopkinton, Mass., which is hereby incorporated by reference in its entirety.

A discussion of dynamically adding storage for a journal may be found in U.S. Pat. No. 7,840,536, entitled "METHODS AND APPARATUS FOR DYNAMIC JOURNAL EXPANSION," issued on Nov. 23, 2010 and assigned to EMC Corporation of Hopkinton, Mass., which is hereby incorporated by reference in its entirety.

Seamless Migration Between Replication Technologies

Traditional methods for migrating between replication technologies require stopping the old replication technology (i.e., the replication technology being replaced) and starting with the new replication technology from scratch. For example, consider a storage array with several volumes replicated using a preexisting replication technology. If a user desires to continue replication but using a new replication technology, such as RecoverPoint by EMC Corporation of Hopkinton, Mass., traditional migration methods require resynchronizing data between the production site and the replication site using the new replication technology once it is brought online. Replicated data sizes can be very large (e.g., on the order of a petabyte) thereby causing resynchronization to take a considerable amount of time, often several weeks, to read. During this time, replication is unavailable.

FIGS. 3A-3C are flow diagrams illustrating example methods for seamless migration from a preexisting replication service configured to provide replication from a production volume at a production site to a replication volume at a replication site according to an example embodiment of the present invention. A storage array may have a preexisting replication technology performing replication on it (i.e., a preexisting replication service), such as EMC Celerra Replicator and EMC MirrorView, both by EMC Corporation of Hopkinton, Mass. The example embodiment method illustrated by the flow charts of FIGS. 3A-3C allow a user to seamlessly transition from the preexisting replication service to a new replication service using a new replication technology, without requiring a full resynchronization of the replicated data and without losing or delaying I/Os.

Figure 4:
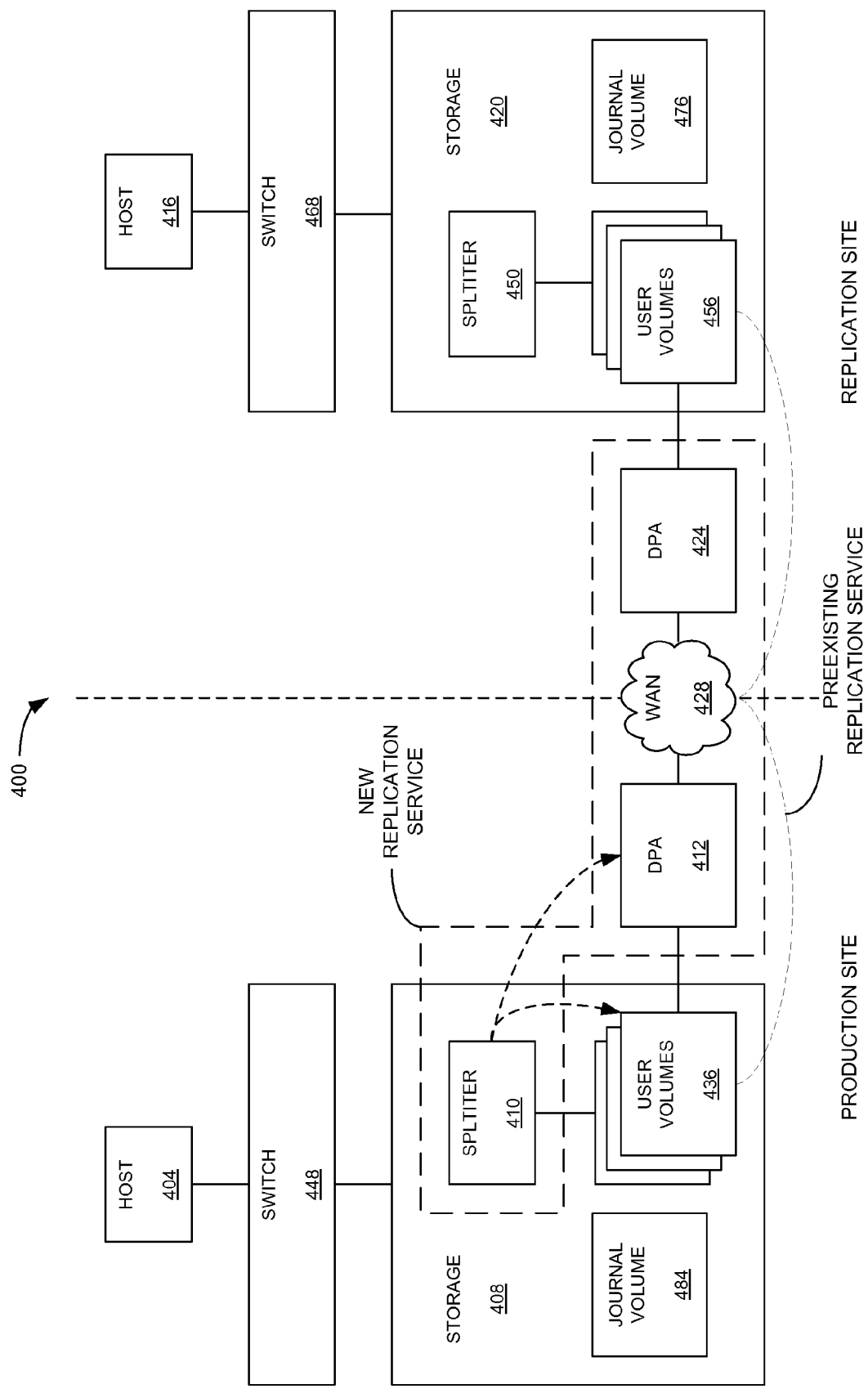
FIG. 4 is a block diagram illustrating a replication environment according to a new replication service.

The flow diagrams of FIGS. 3A-3C may be read in conjunction with the block diagram of FIG. 4 illustrating a replication environment 400 according to the new replication service, which includes a splitter 410 and a production site replication appliance (i.e., data protection appliance (DPA)) 412 at a production site and a splitter 450 and a replication appliance (i.e., DPA) 424 at the replication site. The production site and the replications site may be connected over a wide area network (WAN) 428. It should be noted that the DPAs 412, 424 do not have to be physical devices and may be a set of processes on the respective storage arrays 408, 420 or virtual machines running inside the storage array 408, 420 or at any external host 404, 416. It also should be noted that, although the splitters 410, 450 in FIG. 4 are illustrated as being resident in the storage arrays 408, 420, the splitters 410, 450 also may reside in the switches 448, 468 or in the hosts 404, 416.

FIG. 3A is a flow diagram of an example method according to the present invention including configuring a new replication service (310) to provide replication from the production volume (or set of volumes) (i.e., user volumes) 436 at the production site to the replication volume (or set of volumes) (i.e., user volumes) 456 at the replication site. The method then includes disabling the preexisting replication service (320) and enabling the new replication service 330 to provide seamless migration from the preexisting replication service to the new replication service.

FIG. 3B is a flow diagram illustrating a method according to an example embodiment of the present invention detailing the configuration of a new replication service (310 of FIG. 3A). As illustrated in the flow diagram of FIG. 3B and the block diagram of FIG. 4, at time $t_o$, to configure the new replication service (310), the production volume 436 at the production site may be attached to the splitter 410 as a clean volume, and the replication site volumes 456 also are attached as clean to the replication site splitter 450 at the replica site, which operates in split mode (311). This differs from a traditional replication service that will assume that data in a newly-attached volume is dirty when attaching volumes for replication (e.g., production volume 436 at the production site) and mark the dirty region of the volume as dirty in a delta marking stream such that the data in the volume must be resynchronized.

Accordingly, with the production volume 436 attached as clean (311), the splitter 410 may begin splitting I/Os to the DPA 412 at the production site and the production volume 436. However, it is important to note that, in a preferred embodiment, replication using the new replication service does not yet begin. Rather, the DPA 412 at the production site tracks commands received at the splitter 410 at the production site in a production site delta marking stream stored in a production site journal (i.e., journal volume) 484 (312).

Likewise, the DPA 424 at the replication site tracks commands received at the replication site in a replication site delta marking stream stored in a replication site journal 476 (313).

In a particular embodiment, the DPA 412 at the production site may capture changes to the production volume 436 at the production site, including after the preexisting replication service is disabled (320). Additionally, the DPA 412 may continue to operate in marking mode and the old replication service may be permitted to complete one replication round (i.e., for asynchronous replication technologies, such as EMC Celerra Replicator and EMC MirrorView/Asynchronous, both by EMC Corporation of Hopkinton, Mass.), thereby providing a full consistent image, including a current timestamp that has arrived at the replication site. The preexisting replication service then may be disabled, as described below with respect to FIG. 3C. The DPA 412 then may enable the new replication service and synchronizing the changes made to the production volume 436 captured at the production site with the replication volume 456 at the replication site.

FIG. 3C is a flow diagram illustrating a method according to an example embodiment of the present invention detailing the disabling of the preexisting replication service (320 of FIG. 3A). It should be noted that, in a preferred embodiment, the preexisting replication service is still in operation after the new replication service is configured. For some preexisting replication services, such as asynchronous replication services (e.g., EMC Celerra Replicator and EMC MirrorView/Asynchronous, both by EMC Corporation of Hopkinton, Mass.), there may be intermediate storage (e.g., a buffer) (not shown) storing I/Os that have not yet been synchronized between the production site and the replication site. As illustrated in the flow diagram of FIG. 3C and the block diagram of FIG. 4, to disable the preexisting replications service, the preexisting replication service is instructed to flush commands from intermediate storage (321) at time $t_1$. Flushing the I/Os from the intermediate storage provides a new consistency point for the replication volume which includes I/Os which arrived to the production storage 408 before the DPA 412 started tracking the new incoming data and, possibly, I/Os already tracked by the DPA 412.

For example, a command may be provided by the DPA 412 to the storage via an application programming interface (API) to stop replication using the preexisting replication service. The DPA 412 may then receive confirmation via the API that the intermediate storage has been flushed (322) and remove preexisting replication devices at the production site and at the replication site from the configuration of the preexisting replication service (323). The new replication service may then be enabled (330) (as described above with respect to FIG. 3A).

The DPA 412 can know whether the current replication scheme is synchronous or asynchronous by querying the storage array 408.

After a point in time newer than the point in time the DPA 424 started tracking the changes arrives at the replication site, the delta marker stream in respective journals 484, 476 on both sites includes all the locations which may differ between the production and replication sites. Once the new replication service is enabled, the replication site splitter 450 moves from split mode to fail all mode, thereby preventing new I/Os from arriving at the replication volume 456 other than I/Os generated by the DPA, an initialization process begins, as described above regarding delta marking. The DPA 412 merges the marking streams in the replication and production sites and transfers the locations suspected as different between production and replication sites. Once the initialization process ends, the replication remains continuous.

After configuration, the splitters 410, 450 track changes occurring in both the production and replication sites. However, prior to disabling the preexisting replication service, it is desirable to make sure that all data which arrived in the replication environment 400 before tracking started in the new replication service arrived to the replication site. Accordingly, once the new replication service has an image which is after the time it started tracking changes, the new replication service may start replicating and may disable the old replication because the delta marking streams include all the locations suspected as different.

For synchronous replication services, disabling the preexisting replication service and enabling the new replication service may take approximately one second or less. Additionally, only I/Os tracked during that time will need to be synchronized. However, for asynchronous replication services, it may take up to several hours or more for the latest image to arrive at the replication site, depending on the configuration of the asynchronous replication service. Changes tracked during this longer period of time will then need to be synchronized. However, this does not amount to a degradation of service because those same changes required synchronization under the preexisting asynchronous replication service. Accordingly, migration from a preexisting replication service to a new replication service is seamless to the user.

Figure 5:
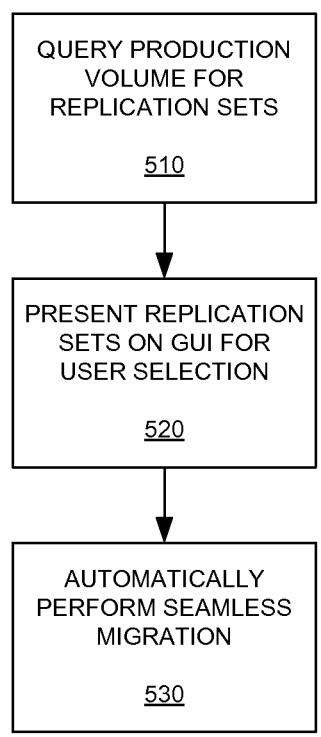
FIG. 5 is a flow diagram illustrating a method for automatic performance of seamless migration from a preexisting replication service to a new replication service.

FIG. 5 is a flow diagram illustrating a method for automatic performance of seamless migration from a preexisting replication service to a new replication service. As illustrated in FIG. 5, in conjunction with the block diagram of FIG. 4, the production volume 420 at the production site 405 may be queried to determine which replication sets are available at the production site 405 (510). A graphical user interface (GUI) may then be presented to a user to enable the user to select a replication set for migration from the preexisting replication service to the new replication service (520). For example, a user may direct the DPA 410 via an interface (e.g., a graphical user interface (GUI)) to query the production volume 420 to return a listing of available replication sets. The user may identify a storage array for querying via credentials, such as Internet protocol (IP) address. The listing of available replication sets then may be presented on the GUI for selection by the user. The DPA 410 then may perform the seamless migration from the preexisting replication service to the new replication service automatically (530) as described above.

Figure 6:
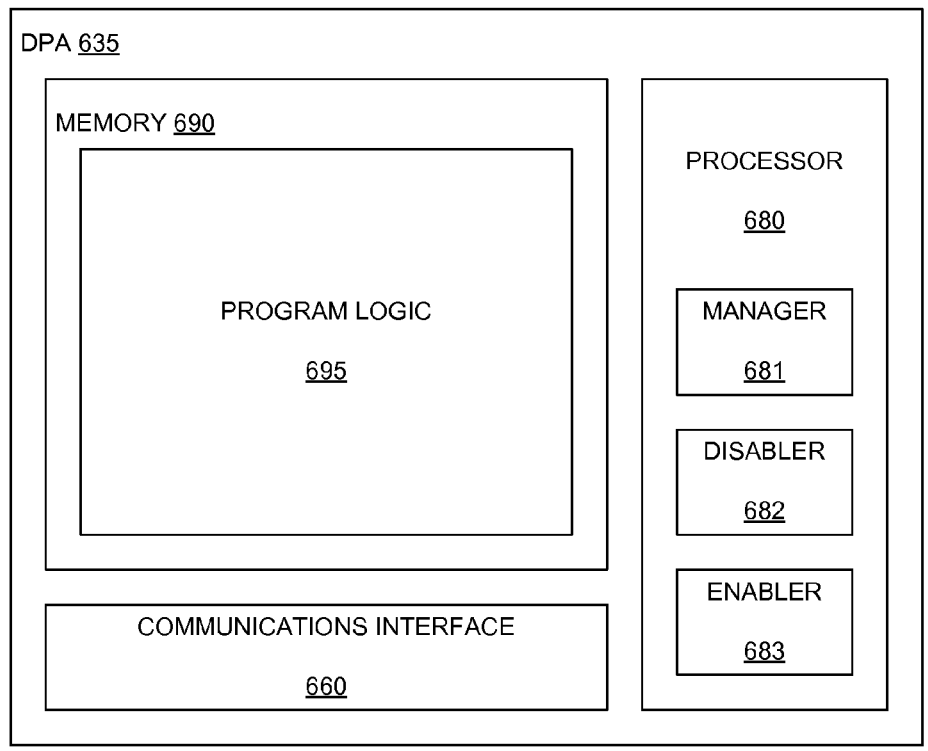
FIG. 6 is a block diagram of an example embodiment apparatus according to the present invention.

FIG. 6 is a block diagram of an example embodiment DPA 635 according to the present invention. The DPA includes memory 690 storing program logic 695, a processor 680 including a manager 681, a disabler 682 and an enabler 683 and a communications interface 660.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 6, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

Figure 7:
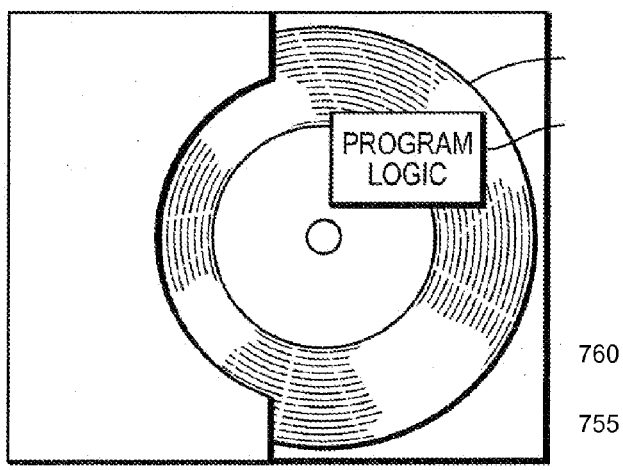
FIG. 7 is an illustration of an example embodiment of the present invention as embodied in program code.

FIG. 7 shows program logic 755 embodied on a computer-readable medium 760 as shown, and wherein the logic is encoded in computer-executable code configured for carrying out the gas controlling process of this invention and thereby forming a computer program product 700.

The logic for carrying out the method may be embodied as part of the aforementioned system, which is useful for carrying out a method described with reference to embodiments shown in, for example, FIGS. 3A-5. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A computer-implemented method for transition from a preexisting replication service, for execution by at least a processor, the method comprising:
   configuring a new replication service to provide replication from a production volume at a production site to a replication volume at a replication site, wherein the new replication service includes a production site splitter and a production site replication appliance at the production site and a replication site replication appliance at the replication site and wherein the production site replication appliance is configured to track commands received at the production site splitter in a production site delta marking stream stored in a production site journal and the replication site replication appliance is configured to track commands received at the replication site in a replication site delta marking stream stored in a replication site journal;
   disabling the preexisting replication service; and
   enabling the new replication service to provide transition from the preexisting replication service to the new replication service.

2. The method of claim 1 wherein configuring a new replication service to provide replication from a production volume at a production site to a replication volume at a replication site comprises:
   attaching the production volume as clean to the splitter at the production site; and
   attaching the replication volume as clean to the splitter at the replication site.

3. The method of claim 2 wherein attaching the production volume as clean to the splitter at the production site and attaching the replication volume as clean to the splitter at the replication site enables the splitters to split commands to the production site replication appliance and the production volume and to the replication site replication appliance and the replication volume.

4. The method of claim 3 wherein enabling the new replication service to provide seamless migration from the preexisting replication service to the new replication service comprises:
   tracking commands received at the splitter at the production site in a production site delta marking stream stored in a production site journal; and tracking commands received at the replication site in a replication site delta marking stream stored in a replication site journal.

5. The method of claim 1 wherein disabling the preexisting replication service comprises instructing the preexisting replication service to flush commands from intermediate storage to provide a new consistency point for the replication volume.

6. The method of claim 5 wherein disabling the preexisting replication service further comprises:
receiving confirmation that the intermediate storage has been flushed; and
removing from configuration of the preexisting replication service preexisting replication devices at the production site and the replication site.

7. The method of claim 1 wherein configuring a new replication service to provide replication from the production volume at the production site to the replication volume at the replication site comprises capturing changes to the production volume at the production site, including after the preexisting replication service is disabled, and wherein enabling the new replication service to provide seamless migration from the preexisting replication service to the new replication service comprises synchronizing the changes to the production volume captured at the production site with the replication volume at the replication site.

8. The method of claim 1 further comprising:
querying the production volume to determine replication sets available at the production site;
presenting a graphical user interface to a user to enable the user to select a replication set for migration from the preexisting replication service to the new replication service; and
automatically performing the seamless migration from the preexisting replication service to the new replication service.

9. An apparatus for seamless transition from a preexisting replication service configured to provide replication from a production volume at a production site to a replication volume at a replication site, the apparatus comprising:
a manager configured to configure a new replication service to provide replication from the production volume at the production site to the replication volume at the replication site, wherein the new replication service includes a splitter and a production site replication appliance at the production site a splitter and a replication appliance at the replication site and wherein the production site replication appliance is configured to track commands received at the production site splitter in a production site delta marking stream stored in a production site journal and the replication site replication appliance is configured to track commands received at the replication site in a replication site delta marking stream stored in a replication site journal;
a disabler configured to disable the preexisting replication service; and
an enabler configured to enable the new replication service to provide transition from the preexisting replication service to the new replication service.

10. The apparatus of claim 9 wherein the manager is further configured to attach the production volume as clean to the splitter at the production site and attach the replication volume as clean to the splitter at the replication site.

11. The apparatus of claim 10 wherein attaching the production volume as clean to the splitter at the production site and attaching the replication volume as clean to the splitter at the replication site enables the splitters to split commands to the production site replication appliance and the production volume and to the replication site replication appliance and the replication volume.

12. The apparatus of claim 11 wherein the enabler is further configured to track commands received at the splitter at the production site in a production site delta marking stream stored in a production site journal and track commands received at the replication site in a replication site delta marking stream stored in a replication site journal.

13. The apparatus of claim 9 wherein the disabler is further configured to instruct the preexisting replication service to flush commands from intermediate storage to provide a new consistency point for the replication volume.

14. The apparatus of claim 13 wherein the disabler is further configured to receive confirmation that the intermediate storage has been flushed and remove from configuration of the preexisting replication service preexisting replication devices at the production site and the replication site.

15. The apparatus of claim 9 wherein the manager is further configured to capture changes to the production volume at the production site, including after the preexisting replication service is disabled, and wherein the enabler is further configured to synchronize the changes to the production volume captured at the production site with the replication volume at the replication site.

16. The apparatus of claim 9 wherein the manager is further configured to query the production volume to determine replication sets available at the production site, present a graphical user interface to a user to enable the user to select a replication set for migration from the preexisting replication service to the new replication service and automatically perform the seamless migration from the preexisting replication service to the new replication service.

17. A computer-program product including a non-transitory computer readable storage medium encoded with computer-program code that, when executed on a processor of a computer, cause the computer to perform transition from a preexisting replication service configured to provide replication from a production volume at a production site to a replication volume at a replication site, the computer program code comprising:
computer-program code for configuring a new replication service to provide replication from the production volume at the production site to the replication volume at the replication site, wherein the new replication service includes a splitter and a production site replication appliance at the production site, a splitter and a replication site replication appliance at the replication site and wherein the production site replication appliance is configured to track commands received at the production site splitter in a production site delta marking stream stored in a production site journal and the replication site replication appliance is configured to track commands received at the replication site in a replication site delta marking stream stored in a replication site journal;
computer-program code for disabling the preexisting replication service; and
computer-program code for enabling the new replication service to provide transition from the preexisting replication service to the new replication service.

18. The computer-program product of claim 17, wherein computer-program code for configuring the new replication service to provide replication from the production volume at the production site to the replication volume at a replication site comprises computer-program code for attaching the production volume as clean to the splitter at the production site and computer-program code for attaching the replication volume as clean to the splitter at the replication site and wherein computer program code for enabling the new replication service to provide seamless migration from the preexisting replication service to the new replication service comprises:
computer-program code for tracking commands received at the splitter at the production site in a production site delta marking stream stored in a production site journal; and
    computer-program code for tracking commands received at the replication site in a replication site delta marking stream stored in a replication site journal.

19. The computer-program product of claim 17 wherein computer-program code for disabling the preexisting replication service comprises:
    computer-program code for instructing the preexisting replication service to flush commands from intermediate storage to provide a new consistency point for the replication volume;
    computer-program code for receiving confirmation that the intermediate storage has been flushed; and
    computer-program code for removing from configuration of the preexisting replication service preexisting replication devices at the production site and the replication site.

20. The computer-program product of claim 17 further comprising:
    computer-program code for querying the production volume to determine replication sets available at the production site;
    computer-program code for presenting a graphical user interface to a user to enable the user to select a replication set for migration from the preexisting replication service to the new replication service; and
    computer-program code for automatically performing the seamless migration from the preexisting replication service to the new replication service.

\* \* \* \* \*